United States Patent [19]

Drews et al.

[11] 4,135,820

[45] Jan. 23, 1979

[54] BEAM COMBINING APPARATUS

[75] Inventors: Udo W. Drews, Glen Ellyn; Norman Shifrin, West Chicago, both of Ill.

[73] Assignee: The Perkin-Elmer Corporation, Norwalk, Conn.

[21] Appl. No.: 846,509

[22] Filed: Oct. 28, 1977

Related U.S. Application Data

[63] Continuation of Ser. No. 611,691, Sep. 9, 1975, abandoned.

[51] Int. Cl.$^2$ .............................................. G01J 3/02
[52] U.S. Cl. .................................... 356/320; 356/325
[58] Field of Search .................................. 356/88–97; 350/162 R, 174, 286, 287

[56] References Cited

U.S. PATENT DOCUMENTS

| | | | |
|---|---|---|---|
| 2,660,087 | 11/1953 | Domeshek | 350/174 X |
| 2,955,508 | 10/1960 | Martin | 356/93 |
| 3,449,050 | 6/1969 | Keahl | 356/89 |
| 3,521,958 | 7/1970 | Treharne | 356/93 |

*Primary Examiner*—F. L. Evans
*Attorney, Agent, or Firm*—Salvatore A. Giarratana; Francis L. Masselle; Edwin T. Grimes

[57] ABSTRACT

A pair of optical beams of radiant energy from separate paths in a spectrophotometer are coaxially merged into a single composite beam with an optical member which resembles a coarse echelette grating. A reflective surface which includes the surfaces of sidewalls within a plurality of parallel grooves is disposed on the optical member. The grooves are arranged in a lateral array and are generally V-shaped cross-sectionally. The beams to be combined are directed upon the sidewalls and the composite beam is emitted therefrom in accordance with the law of reflection. When the beams to be combined include non-collimated rays, shadowing is provided by the portion of the optical member between adjoining sidewalls of adjacent grooves to reduce flare. Furthermore, image aberrations as caused by off-axis operation due to use of a spherical mirror in the beam combining arrangement, are substantially corrected by the optical member.

5 Claims, 5 Drawing Figures

BEAM COMBINING APPARATUS

This is a continuation of application Ser. No. 611,691, filed Sept. 9, 1975 and now abandoned.

BACKGROUND OF THE INVENTION

This invention relates to optical beam combining arrangements and particularly to beam combiner members which merge the dual beams of a spectrophotometer into a composite beam along an axis. In a dual beam spectrophotometer, sample and reference beams of radiant energy are directed from separate substantially equivalent optical paths to a photoelectric detector where the intensity of each beam is measured. For the paths of the beams to be optically equivalent, the absorbing and reflecting characteristics of the optical elements in those paths must be matched. In prior art beam combining arrangements, substantial optical equivalence is only made possible by moving mirrors which then introduce mechanical and phasing problems. Furthermore, photoelectric detectors respond differently to beams making different incident angles thereon and this presents a problem with prior art beam combining arrangements which do not coaxially merge the beams into a composite beam. Otherwise, very expensive off-axis aspheric mirrors must be utilized in prior art beam combining arrangements to avoid image aberrations when the beams being combined are divergent.

SUMMARY OF THE INVENTION

It is the general object of the present invention to provide a beam combining arrangement which overcomes or mitiages the disadvantages of the prior art.

It is a specific object of the present invention to provide a beam combining arrangement which coaxially merges beams into a composite beam without resort to rotating sector mirrors or other moving parts.

It is another object of the present invention to provide a beam combining arrangement which compensates for image aberrations due to off-axis operation without the use of aspheric folding mirrors.

It is still another object of the present invention to provide a beam combiner member which coaxially merges radiant energy from separate paths into a composite beam without the use of moving parts.

These objects are accomplished according to a typical embodiment of the present invention by arranging a spherical folding mirror to direct each beam toward a reflective surface on a beam combiner member. The reflective surface includes the surfaces of sidewalls within a plurality of parallel grooves which are disposed in a planar array across the beam combiner member. Each groove is generally V-shaped cross-sectionally and the sidewalls of all grooves intersect at the same included angle. Lineal intersections are presented between the sidewalls of adjacent grooves in the planar array which is disposed perpendicularly across the axis along which the beams are to be merged as a composite beam. The beams are directed to the reflective surface at the same angle of incidence relative to the axis of the composite beam. The included angle between the sidewalls of the grooves is greater than 90° but no greater than 120° and is less than twice the angle of incidence for non-collimated beams to prevent flare.

DESCRIPTION OF THE PREFERRED EMBODIMENTS

Figure 1:
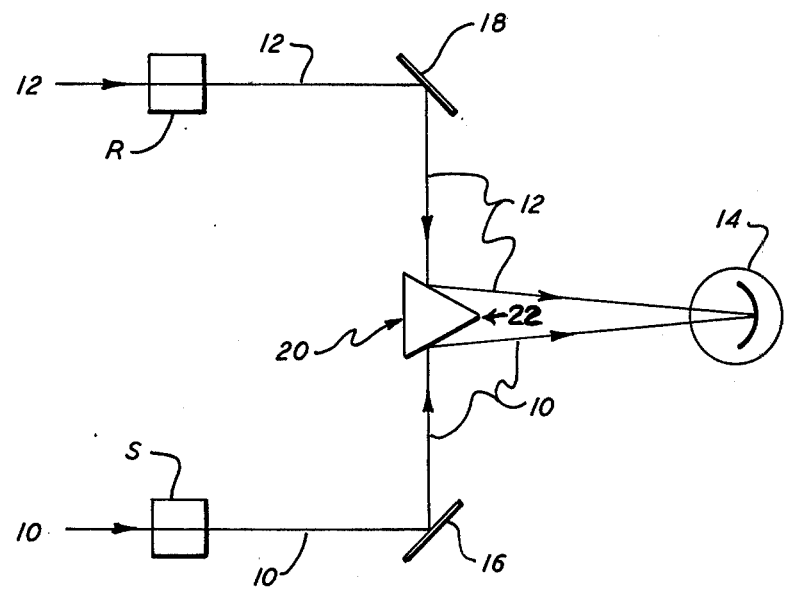
FIG. 1 is an optical schematic of a prior art beam combining arrangement.

Turning now to the drawings, the beam combining arrangement in a prior art dual beam spectrophotometer is illustrated in FIG. 1 where two beams 10 and 12 of radiant energy are directed to a photoelectric detector 14 from separate substantially equivalent optical paths. The beams 10 and 12 are produced by dividing the output of a monochromator (not shown) and are initially of equal intensity. A sample S is placed in the path of beam 10 and a reference R is placed in the path of beam 12, while mirrors 16 and 18 respectively are disposed in these paths for folding the beams in the direction of a beam combiner member 20. Reflective surfaces on the beam combiner member 20 then fold the beams in the direction of the photoelectric detector 14 which monitors the intensity of each beam. To simplify FIG. 1, only the principal ray of each beam 10 and 12 is shown, but it should be appreciated that the rays in these beams could be parallel, convergent, or divergent at different locations in the paths. Furthermore, the mirrors 16 and 18 could be of the required curvature for converging or diverging the rays in the beams to effect a power.

The reflective surfaces of the beam combiner 20 are shown in FIG. 1 to be the faces of a prism which intersect of a vertex 22 and which are separated by a dihedral angle. However, a pair of mirrors disposed at the same dihedral angle could also serve as the beam combiner member 20 in this prior art arrangement. Although the paths of the beams 10 and 12 from the combiner member 20 to the photoelectric detector 14 will approach coaxiality as the beams are imaged closer to the vertex 22, it should be appreciated that absolute coaxiality is impossible with this beam combining arrangement. Furthermore, the size of the beams 10 and 12 must be decreased as they are imaged closer to the vertex 22 and any optical defects in the reflective surfaces of the combiner member 20 will then assume greater importance. Of course, the desired coaxiality suffers as the size of the beams 10 and 12 is increased to render such optical defects less significant. Otherwise, the photoelectric detector 14 will respond identically to levels of radiant energy from either beam 10 or 12 only if these beams are directed thereto coaxially as a composite beam. Therefore, variation in response of the photoelectric detector 14 which causes photometric error must always be expected when the prior art beam combining arrangement of FIG. 1 is utilized. Typically, such photometric error is several percent for ultraviolet wavelengths and where the photoelectric detector 14 is a photomultiplier. Other beam combining arrangements are well known in the art which include half mirrors, vertically stacked right and left reflecting prisms and semi-reflecting grids, but none of these arrangements are pertinent to either the strcture or the concept which is disclosed in this application. Therefore, such arrangements will not be discussed further herein.

Figure 2:
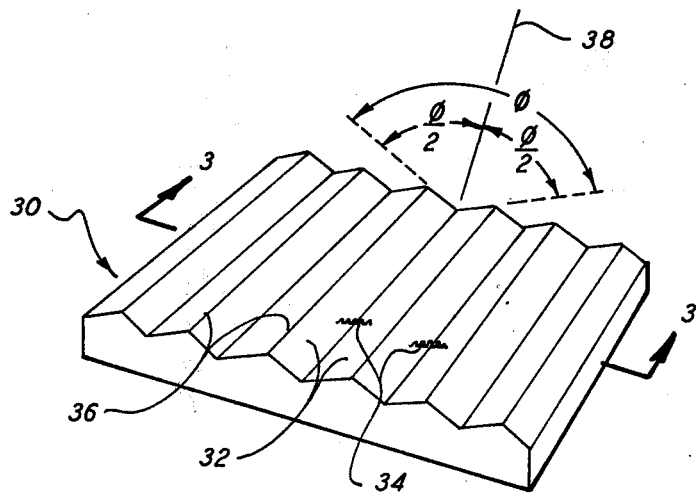
FIG. 2 is an enlarged perspective view of a beam combiner member in accordance with the present invention.

A beam combiner member 30 in accordance with the present invention is illustrated in FIG. 2. A reflective surface which includes the surfaces of sidewalls 32 within a plurality of parallel grooves 34 is disposed on the combiner member 30. The grooves 34 are adjacently disposed in a planar array across the combiner member 30 with each groove 34 having the same generally V-shaped cross-section. Lineal intersections 36 between the sidewalls of adjacent grooves 34 are presented by the planar array through which a normal 38 passes, while the sidewalls 32 of each groove 34 intersect at the same included angle $\phi$. Although the sidewalls 32 are shown to have planar surfaces which are separated by equal dihedral angles in FIG. 2, the combiner member 30 could have nonplanar surfaces. Furthermore, where it is desirable to effect an optical power, the grooves 34 of the combiner member 30 could be disposed in a non-planar array rather than in the planar array shown in FIG. 2. Of course, both the surfaces of the sidewalls 32 and the array of the grooves 34 could be non-planar on the beam combiner member 30 of this invention.

Figure 3:
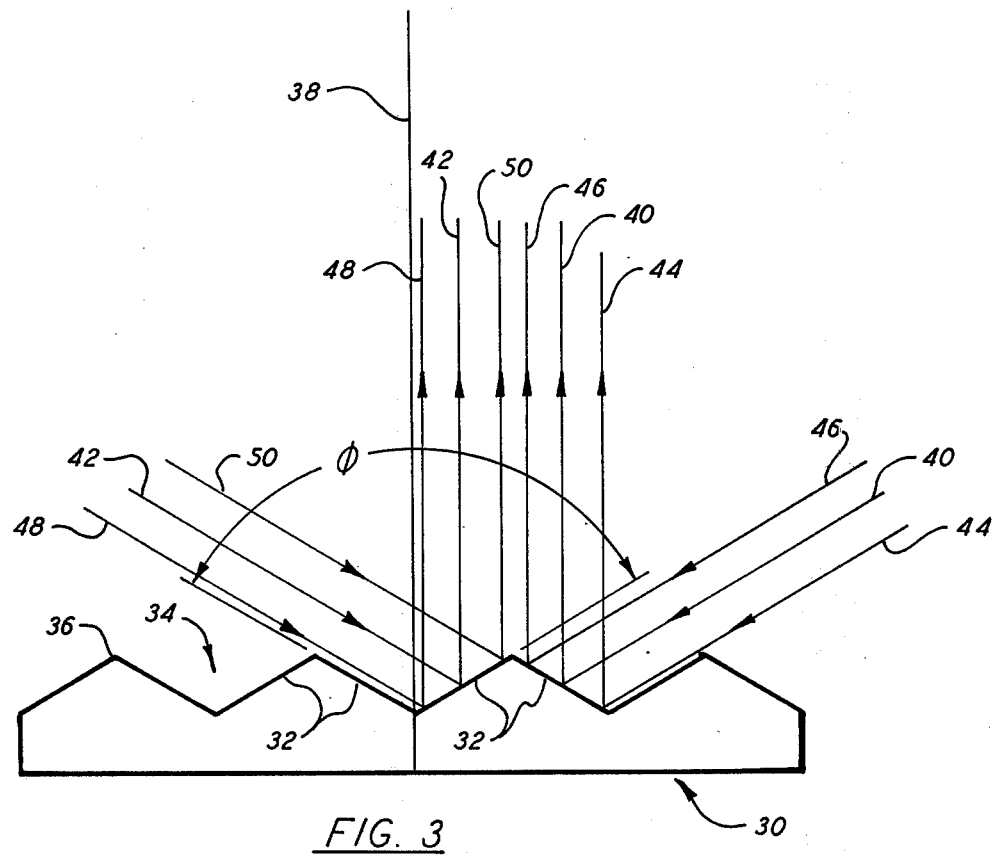
FIG. 3 is a fragmentary cross-sectional view taken along ling 3—3 of FIG. 2.

Operation of the beam combiner member 30 in the dual beam spectrophotometer application of FIG. 1 is illustrated in FIG. 3. The rays of the sample and reference beams are collimated in FIG. 3 where only a principal ray 40 and 42 respectively and edge rays 44, 46 and 48, 50 respectively of each beam are shown for the sake of clarity. Each beam is directed against the reflective surface of the combiner member 30 at the required angle to be reflected along the normal 38 from the planar array of the grooves, in accordance with the laws of reflection. Of course, substantially all of the rays in both beams are reflected along the normal 38 as a composite beam which in the spectrophotometer is axially aligned with the photoelectric detector 14 so that the planar array of the grooves 34 must be disposed perpendicularly across that alignment axis. Furthermore, the rays of each beam are parallel to the sidewalls 32 because otherwise flare could result to reflect some rays out of the composite beam with a resulting loss of intensity. In FIG. 3, the included angle $\phi$ between the sidewalls 32 of each groove 34 is 120° which is the maximum included angle at which the above described optical conditions can be attained with no loss of intensity due to flare. However, smaller included angles greater than 90° could be utilized but the angle of incidence of the beams relative to the normal 38 will be increased accordingly, so that the beams will no longer be parallel to the sidewalls 32. Of course, the angle of incidence of the beams relative to the normal 38 is 60° in FIG. 3, whereas this angle approaches 90° as the included angle $\phi$ approaches 90°.

To avoid flare in FIG. 3 when the beams are either converging or diverging, the edge rays must have a greater angle of incidence with the normal 38 than that of the sidewalls 32. Under such conditions, the linear intersections between the sidewalls 32 of each groove 34 are shadowed by the lineal intersections 36 between adjoining sidewalls 32 of adjacent grooves 34. Furthermore, such conditions can only be attained when the angle $\phi$ between the sidewalls 32 of each groove 34 is less than 120°. Therefore, the angle $\phi$ separating the sidewalls is less than the sum of the angles of incidence which are made by the principal rays 40 and 42 respectively relative to the normal 38 in the preferred embodiment of the beam combiner member 30.

Figure 4:
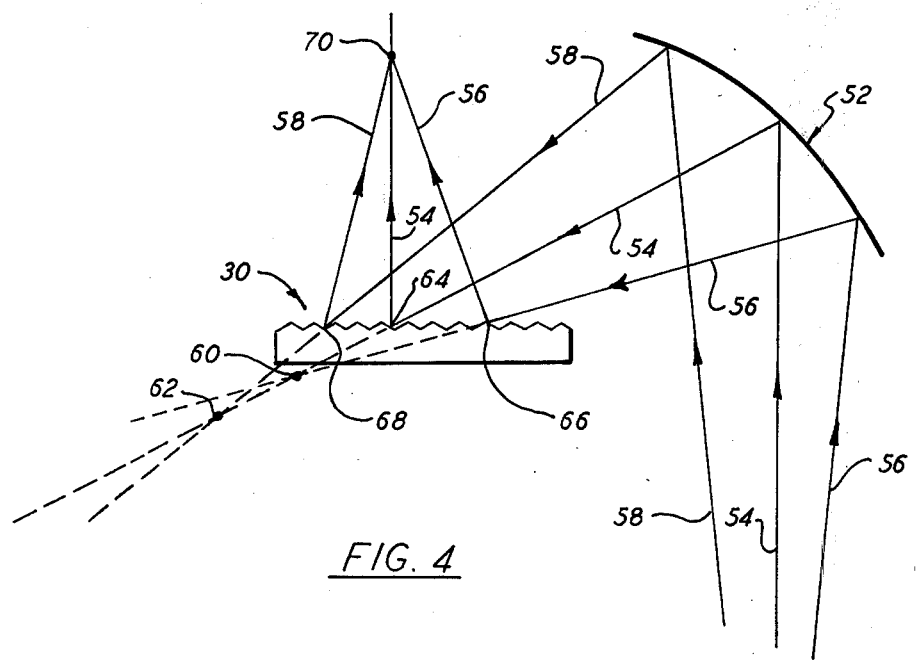
FIG. 4 is a partial optical schematic illustrating the manner in which the beam combiner member of FIGS. 2 and 3 corrects for off-axis distortion in the beam combining arrangement of the present invention.

As illustrated in FIG. 4, correction of image aberration due to off-axis operation is possible with the beam combining arrangement of this invention. In this beam combining arrangement, mirrors 52 having a spherical surface are utilized to direct each beam to the beam combiner member 30 of FIGS. 2 and 3 however, only one mirror 52 is shown in the interest of clarity. A principal ray 54 and edge rays 56 and 58 respectively are included in each beam which of course, are folded by the mirrors 52. It will be appreciated by those skilled in the art that the edge rays 56 and 58 originate from a common point (not shown) on the principal ray 54 but as a result of the off-axis operation, they cross the principal ray 54 at points 60 and 62 respectively after being folded by the mirror 52. Because the reflective surface of the combiner member 30 is made up of the sidewalls 32 within the plurality of grooves 34, the principal ray 54 and edge rays 56 and 58 respectively of each beam impinge on a different sidewall 32 at points 64, 66 and 68 respectively. Therefore, the principal ray 54 and edge rays 56 and 58 are each reflected by a different sidewall to the same focal point 70 because the angle of reflection from the sidewalls increases as they are located farther to the left laterally across the planar array. Of course, an undistorted image is presented at focal point 70, without the off-axis abberation that would normally be expected. The off-axis aberration could also be corrected by using mirrors having an aspheric surface instead of the spherical mirrors 52, however, such aspheric mirrors are very expensive. It should be realized without further explanation, that the prior art beam combiner member 20 in FIG. 1 provides no correction for the image aberration which is caused by off-axis operation and additional photometric error would result therefrom, unless aspheric mirrors were utilized.

The beam combiner member 30 which is illustrated in FIGS. 2-4 could be fabricated of any suitable material, such as glass or metal. Method of fabrication for the combiner member 30 depends on the number and spacing of the grooves 34 which, of course, depends on the optical requirements of the beam combining arrangement. Typically, the combiner member 30 is fabricated by ruling the grooves 34 into a solid aluminum blank using a ruling engine of the type used to rule coarse infrared diffraction gratings. The blank is prepolished to an optically flat finish of approximately two fringes. The ruling diamond is ground to conform to the desired cross-sectional shape of the grooves 34 and therefore, includes the dihedral angle $\phi$ for the combiner member 30 shown in FIGS. 2-4. If more than one ruling pass is utilized, the final pass should leave the faces with an optically flat finish of two fringes or better to minimize ray scatter and maximize the optical equivalency of the sidewalls 32.

While groove spacings of 1 mm have been used on the beam combiner member 30 in spectrophotometer applications having sample and reference beams in the ultraviolet wavelength range, narrower spacings could be utilized to the point where diffraction effects are encountered. Broader spacings could also be utilized, but because more material must be displaced during fabrication, an optically flat finish is more difficult to rule. Of course, with narrower spacing a greater number of edge intersections 36 between the sidewalls 32 of adjacent grooves 34 will be present on the combiner member 30 for a composite beam of a given diameter. Because diffraction effects at such groove intersections or any defects thereon will cause ray scatter, the spacing of the grooves 34 can not be made indiscriminately narrow. However, the position and alignment of the combiner member 30 in the optical path of the beams becomes more critical as the spacing of the grooves 32 is broadened. Therefore, groove spacing is a matter of design compromise in spectrophotometers and for a composite beam diameter of 10 mm, the spacing between grooves of 1 mm, is preferred.

For practical reasons the original ruled master of the beam combiner member 30 is not used in spectrophotometer applications. It is less expensive and optically better to use a replica made from the original master in such applications. The method of making replica mirrors and gratings is well known in the art and need not be described herein. However, it is important that the sidewalls 32 of each groove 34 be of uniform and equal reflectance for all wavelengths of optical radiation over the predetermined spectrophotometric range of operation. This is accomplished by applying evaporated aluminum of high purity very rapidly to the cold sidewalls 32, as a reflective coating. To further facilitate the attainment of uniform and equal reflectance, all sidewalls should be coated at the same time from a single source of evaporated aluminum which is arranged to expose the sides equally.

Figure 5:
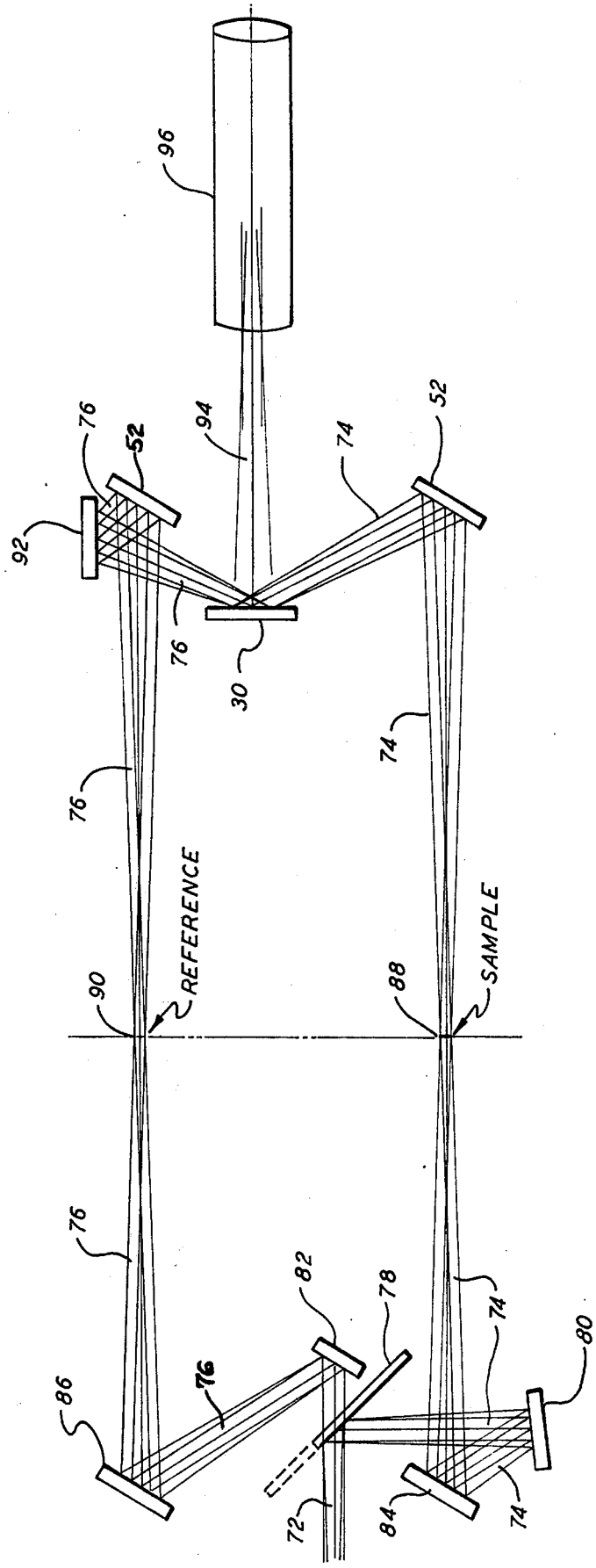
FIG. 5 is an optical schematic of a spectrophotometer which includes the beam combining arrangement of FIG. 4 and the beam combiner member of FIGS. 2 and 3.

A spectrophotometer having the beam combining arrangement of FIG. 4 with the combiner member 30 of FIGS. 2 and 3 is illustrated in the optical schematic of FIG. 5. An output beam 72 from a monochromator (not shown) is divided into two alternately timed sequenced beams 74 and 76 by a rotating chopper 78 having a reflecting sector blade. The beams 74 and 76 are then folded to parallel paths by flat mirrors 80 and 82, and at optically equivalent points are again folded by toroidal mirrors 84 and 86 to converge at points 88 and 90 in forming optically equal images of the monochromator exit slit. The beams 74 and 76 pass through the sample S and the reference R which are placed at points 88 and 90 respectively, and then diverge until folded by spherical mirrors 52. To make the reference path equivalent to the sample path, beam 76 is then folded by a flat mirror 92 which balances the reflection at flat mirror 80. Beams 74 and 76 are then directed to the beam combiner member 30 at equal angles with the normal to the planar array of the grooves and reflected therefrom coaxially as a composite beam 94 in the direction of the photoelectric detector 96. To avoid any ray flare, the sidewalls of the grooves on the beam combiner member 30 are disposed at an angle of 58.5° with the normal to the planar array in accordance with the above discussion regarding FIG. 3. Therefore, the principal rays of the beams 74 and 76 are directed to the beam combiner member 30 at an angle of 63° with the normal to the planar array.

What we claim is:

1. In a spectrophotometer of the type wherein sample and reference beams of diverging radiant energy are directed from separate substantially equivalent optical paths to a photoelectric detector, whose response varies with the position and/or angle of incidence of a radiation beam incident on the sensitive receiving surface of said detector, the combination comprising:

a beam combining arrangement including a beam combiner member with a reflective surface and a spherical folding mirror in the optical path of each said beam, said reflective surface including the surfaces of sidewalls within a plurality of parallel grooves, said grooves being adjacently disposed in a planar array across said beam combiner member, each said groove being V-shaped cross-sectionally with said sidewalls thereof being separated by a dihedral angle, said planar array presenting lineal intersections between said sidewalls of adjacent grooves and being disposed perpendicularly across an alignment axis with said photoelectric detector, said divergent beams being converged and directed to said beam combiner member by said spherical folding mirrors at the same angle of incidence relative to said alignment axis, said dihedral angle being less than twice said angle of incidence while being greater than 90° and no greater than 120°, said sidewalls reflecting said beams to a common focal point along said alignment axis in correcting image aberration caused by the off-axis operation of said spherical folding mirrors.

2. The combination of claim 1 wherein said dihedral angle is 117° and said angle of incidence is 63°.

3. The combination of claim 1 wherein the reflectance of each said sidewall is the same for all wavelengths of optical radiation over a predetermined range.

4. The combination of claim 1 wherein said dihedral angle is 117° and said angle of incidence is 63°, while the reflectance of each said sidewall is the same for all wavelengths of optical radiation over a predetermined range.

5. In a spectrophotometer of the type wherein sample and reference beams of non-collimated radiant energy are directed from separate substantially equivalent optical paths to a photoelectric detector, whose response varies with the position and/or angle of incidence of a radiation beam incident on the sensitive receiving surface of said detector, the combination comprising:

a beam combining arrangement including a beam combiner member with a reflective surface and a spherical folding mirror in the optical path of each said beam, said reflective surface including the surfaces of sidewalls within a plurality of adjacent parallel grooves, said grooves being arrayed across an alignment axis with said photoelectric detector, said sidewalls of adjacent grooves having lineal intersections therebetween in a direction perpendicular to the direction of said alignment axis, said beams being directed to said sidewalls by said spherical folding mirrors, said sidewalls reflecting said beams to a common focal point along said alignment aixs in correcting image aberration caused by the off-axis operation of said spherical folding mirrors.

* * * * *